(12) United States Patent
Kumar et al.

(10) Patent No.: US 12,464,591 B1
(45) Date of Patent: Nov. 4, 2025

(54) METHOD AND SYSTEM TO ENHANCE RRC RE-ESTABLISHMENT PROCEDURE IN NR ACCESS NETWORK

(71) Applicant: SAMSUNG ELECTRONICS CO., LTD., Suwon-si (KR)

(72) Inventors: Vikash Kumar, Jharkhand (IN); Akhil Shukla, Karnataka (IN); Allen Job, Kerala (IN); Palani Lakshamanan, Karnataka (IN); Dheeraj Kumar, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 470 days.

(21) Appl. No.: 17/962,183

(22) Filed: Oct. 7, 2022

Related U.S. Application Data

(63) Continuation of application No. PCT/KR2022/010813, filed on Jul. 22, 2022.

(30) Foreign Application Priority Data

Jul. 23, 2021 (IN) .............................. 202141033115
Jun. 17, 2022 (IN) .............................. 202141033115

(51) Int. Cl.
*H04W 76/19* (2018.01)
*H04L 1/1812* (2023.01)
(Continued)

(52) U.S. Cl.
CPC ........... *H04W 76/19* (2018.02); *H04L 1/1812* (2013.01); *H04W 72/23* (2023.01); *H04W 76/20* (2018.02)

(58) Field of Classification Search
None
See application file for complete search history.

(56) References Cited

U.S. PATENT DOCUMENTS

| 8,767,674 B2 | 7/2014 | Park et al. |
| 10,362,569 B2 | 7/2019 | Cho et al. |

(Continued)

FOREIGN PATENT DOCUMENTS

| CN | 111526599 | 8/2020 |
| KR | 10-2012-0067937 | 6/2012 |

(Continued)

OTHER PUBLICATIONS

Extended European Search Report dated Sep. 24, 2024 issued in European Patent Application No. 22846303.0.

(Continued)

*Primary Examiner* — Kouroush Mohebbi
(74) *Attorney, Agent, or Firm* — NIXON & VANDERHYE P.C.

(57) ABSTRACT

Embodiments herein provide a method for handling a RRC re-establishment procedure in a wireless network by a network apparatus. The method includes detecting a radio link failure at a UE in the wireless network; receiving an RRC re-establishment request message from the UE; sending a downlink RRC re-establishment message and facilitating the allocation of an uplink grant to the UE; receiving a RRC re-establishment complete message from the UE on the allocated uplink grant resource. The method can be used to improve RRC re-establishment procedure completion time by efficient provisions of UL grant allocation to send a RRC Re-EstablishmentComplete. Using the disclosed method, there is drastic signaling reduction/resource wastage during the RRE procedure, thereby resulting in power saving of the UE and the network apparatus.

12 Claims, 9 Drawing Sheets

(51) Int. Cl.
*H04W 72/23* (2023.01)
*H04W 76/20* (2018.01)

(56) References Cited

U.S. PATENT DOCUMENTS

| | | |
|---|---|---|
| 10,368,287 B2 | 7/2019 | Cho et al. |
| 11,997,740 B2 | 5/2024 | Li et al. |
| 2013/0142098 A1 | 6/2013 | Kwon et al. |
| 2013/0259003 A1 | 10/2013 | Kwon et al. |
| 2019/0268961 A1* | 8/2019 | Tsai .................. H04W 76/19 |
| 2020/0053795 A1 | 2/2020 | Lin et al. |
| 2020/0314916 A1 | 10/2020 | Park et al. |

FOREIGN PATENT DOCUMENTS

| | | |
|---|---|---|
| KR | 10-2013-0018101 | 2/2013 |
| WO | 2021/014280 | 1/2021 |
| WO | 2021/067959 | 4/2021 |

OTHER PUBLICATIONS

Indian Examination Report issued May 29, 2023 in corresponding Indian Patent Application No. 202141033115.
Search Report and Written Opinion dated Oct. 31, 2022 issued in International Patent Application No. PCT/KR2022/010813.
3GPP TS 38.331, "3rd Generation Partnership Project; Technical Specification Group Radio Access Network; NR; Radio Resource Control (RRC) protocol specification", Release 16, Jun. 2021, 959 pages.

\* cited by examiner

METHOD AND SYSTEM TO ENHANCE RRC RE-ESTABLISHMENT PROCEDURE IN NR ACCESS NETWORK

CROSS-REFERENCE TO RELATED APPLICATIONS

This application is a continuation of International application PCT/KR2022/010813, designating the United States, filed on Jul. 22, 2022, in the Korean Intellectual Property Receiving Office and claiming priority to Indian Complete patent application No. 202141033115, filed on Jun. 17, 2022, in the Indian Patent Office, and to Indian Provisional Patent Application No. 202141033115, filed on Jul. 23, 2021, in the Indian Patent Office, the disclosures of all of which are incorporated by reference herein in their entireties.

BACKGROUND

Field

The disclosure relates to a wireless network, and for example is related to a method, a User Equipment (UE), and a network apparatus to enhance radio resource control (RRC) re-establishment procedure in the wireless network (e.g., new radio (NR) access network or the like).

Description of Related Art

In wireless communication, a RRC Re-Establishment (RRE) procedure is a situation where a UE/terminal has detected radio link failure and tries to regain the radio link by performing a PRACH (Physical Random Access Channel) procedure. After Msg4 (DL RRE) stage, the UE/terminal has no valid PUCCH/SR (Physical Uplink Control Channel/Scheduling Request) configuration and needs a Uplink (UL) grant to be able to send Msg5 (RRE Complete) which incurs another PRACH signalling. Current procedure of RRE in a fifth generation New radio (5G NR) has an unnecessary PRACH signalling overhead as well as latency (since PRACH has its own SFN only at which it can be transmitted).

In general, the RRC Re-Establishment is a procedure initiated by the UE/terminal upon detecting N310 consecutive Radio link failures followed by expiry of T310 timer. During the RRE procedure, after Msg4 (DL DCCH: RRC Re-Establishment) is sent by a gNB, the UE/terminal needs a UL grant to transmit Msg5 (UL DCCH: RRC ReEstablishmentComplete). But the UE/Terminal, at this stage has no dedicated SR Resource to ask for a UL grant. So, by specification guidance (unable to transmit SR), the terminal/UE performs a RandomAccess procedure to get the UL grant. This additional PRACH signalling (to get a UL grant) is an overhead and increases the completion time of RRE procedure, thereby creating both a Service impact at the terminal/UE as well as sub-optimal power usage.

In the existing methods/systems, the 5G NR aims for high data rate transmission and ultra-reliable/available low-latency links. The RRC ReEstablishment is a procedure initiated by the terminal/UE upon detecting N310 consecutive Radio link failures followed by expiry of T310 timer. During the RRE procedure, after Msg4 (DL DCCH: RRC ReEstablishment) is sent by gNB, the UE needs the UL grant to transmit Msg5 (UL DCCH: RRC ReEstablishmentComplete). But the terminal/UE, at this stage has no dedicated SR Resource to ask for the UL grant. So, by Specification guidance (unable to transmit SR), the terminal/UE performs a RandomAccess procedure to get the UL grant. This additional PRACH signalling (to get the UL grant) is an overhead and increases the completion time of RRE procedure, thereby creating both a Service impact at the terminal as well as sub-optimal power usage.

In an example, when the UE detects N310 number of consecutive out-of-sync indication from lower layers, the UE starts time T310. If T310 expires, the UE starts the Re-Establishment procedure. The UE RESETs MAC, releases SpCellConfig.Re-Establishment procedure starts with a preamble transmission. Msg3 in this case is UL CCCH: RRC Re-EstablishmentRequest. Msg4 (DL DCCH: RRC Re-Establishment) is transmitted by the gNB. In order to transmit Msg5 (RRC Re-Establishment Complete), the UE needs the UL grant. At this stage since the UE has no dedicated SR/PUCCH configuration available to send a SR, the UE falls back to PRACH procedure to get the UL grant. This (fall-back to a PRACH procedure to get the UL grant) is an unnecessary signalling overhead in NR RRE, which also increases the latency of the procedure (as well as the amount of time Terminal remains out of sync).

RRC Re-Establishment: The UE upon detecting radio-link failure initiates the RRE procedure to re-establish the radio link. In this procedure, the UE initiates a random access signalling. The 4-step RACH procedure will be performed, in which Msg3 will be a UL CCCH: RRC Re-EstablishmentRequest. The Msg4 will be a DL DCCH: RRC Re-Establishment. After Msg4, the UE gets the UL grant via another PRACH procedure to send the Msg5 (RRE Complete).

Random Access: The UE uses random access procedure to gain UL synchronization and a UL grant for first uplink transmission.

FIG. 1 illustrating a scenario of method to improve RRC Re-Establishment procedure in a wireless network (1000a) (e.g., 5G NR or the like), according to the prior arts.

Referring to FIG. 1 consider conventional methods and systems, 3GPP TS 38.300 specification defines the action at RRE—to initiate a random access procedure. The 3GPP TS 38.331 specification defines that upon initiation of RRE, the UE (100) RESETs MAC and releases SpCellConfig (which includes dedicated SR/PUCCH resources). DCCH: RRC Re-Establishment message does not contain any dedicated PUCCH configuration. 3GPP TS 38.321 MAC Specifications says that if the UE (100) has no valid PUCCH resource, the UE (100) must perform a random access procedure to get UL grant. As can be seen, the UE (100) has no way to get UL grant for Msg5 (RRC Re-Establishment Complete) transmission. The flow is as follows:
  a) TS 38.331, Sec 5.3.7.1
    a. Upon initiation of the procedure, the UE (100) shall:
      i. suspend all RBs, except SRB0;
      ii. reset MAC;
      iii. release the MCG SCell(s), if configured;
      iv. release spCellConfig, if configured;
  b) TS 38.300, Sec 9.2.6
    a. The random access procedure is triggered by a number of events:
      i. RRC Connection Re-establishment procedure;
  c) TS 38.321, Sec 5.4.4
    a. if the MAC entity has no valid PUCCH resource configured for the pending SR:
    b. initiate a Random Access procedure (see clause 5.1) on the SpCell and cancel the pending SR d) As per TS 38.331, Sec 6.2.2
   a. RRCReestablishment::=SEQUENCE {
   b. rrc-TransactionIdentifier RRC-TransactionIdentifier,
   c. criticalExtensions CHOICE {
   d. rrcReestablishment RRCReestablishment-IEs,
   e. RRCReestablishment-IEs::=SEQUENCE {
   f. nextHopChainingCount NextHopChainingCount, Referring to FIG. 1, at 1, the UE (100) is attached with the network apparatus (200) and the UE (100) is in the RRC-_connected state. At 2, the UE (100) detects a radio link failure after the T310 expiry. At 3, the UE (100) sends a preamble (MSG1) to the network apparatus (200). At 4, the network apparatus (200) sends the RAR (MSG2) to the UE (100) based on the preamble. At 5, the UE (100) sends a UL CCCH (MSG3): RRC reestablishment request to the network apparatus (200). At 6, the network apparatus (200) sends the DL DCCH (MSG4): RRC reestablishment to the UE (100). At 7, the UE (100) obtains the UL grant using PRACH procedure. At 8, the UE (100) sends a UL DCCH: RRC reestablishmentcomplete (MSG5) to the network apparatus (200).

Thus, it is desired to address the above mentioned disadvantages or other shortcomings or at least provide a useful alternative.

SUMMARY

Embodiments of the disclosure provide a method, a UE, and a network apparatus to enhance RRC re-establishment procedure in a NR radio access network (e.g., 5G NR Standalone system or the like).

The method can be used to improve RRC Re-establishment procedure completion time by efficient provisions of UL grant allocation to send RRC Re-EstablishmentComplete. Using the disclosed method, there is drastic signaling reduction/resource wastage during the RRE procedure, thereby resulting in power saving of the UE and the network apparatus.

In the disclosed method assisting the UE performing the faster resumption of radio connection and data transmission. The disclosed method assisting the network apparatus reducing a random access overhead. Based on the disclosed method, the RRE procedure is simplified and has a lower latency and a better chance of success due to reduced signalling.

Accordingly, an example embodiment herein provides a method for handling a radio resource control (RRC) re-establishment procedure in a wireless network. The method includes: detecting, by a network apparatus in the wireless network, a radio link failure at a user equipment (UE) in the wireless network; receiving, by the network apparatus, an RRC re-establishment request message from the UE; sending, by the network apparatus, a downlink RRC re-establishment message and facilitating the allocation of an uplink grant to the UE; and receiving, by the network apparatus, a RRC re-establishment complete message from the UE on the allocated uplink grant resource.

In an example embodiment, the sending, by the network apparatus, the downlink RRC re-establishment message and facilitating the allocation of the uplink resource grant to the UE includes: sending, by the network apparatus, the downlink RRC re-establishment message to the UE, receiving, by the network apparatus, a hybrid automatic repeat request (HARQ) level acknowledgement from the UE for the sent downlink RRC re-establishment message 4 (msg4), and allocating, by the network apparatus, a pre-emptive uplink resource grant after receiving the HARQ level acknowledgement from the UE for the sent downlink RRC re-establishment message for UE to transmit RRC Re-establishment Complete message 5 (msg5).

In an example embodiment, sending, by the network apparatus, the downlink RRC re-establishment message and facilitating the allocation of the uplink resource grant to the UE includes: sending, by the network apparatus, the downlink RRC re-establishment message including a dedicated scheduling request (SR) configuration in a downlink dedicated control channel (DL DCCH) RRC Re-Establishment message to the UE, receiving, by the network apparatus, a SR for requesting an UL resource grant from the UE, and sending, by the network apparatus, an UL resource grant to the UE in a message 5 based on the received SR.

In an example embodiment, sending, by the network apparatus, the downlink RRC re-establishment message and facilitating the allocation of the uplink resource grant to the UE includes: sending, by the network apparatus, the downlink RRC re-establishment message to the UE, receiving, by the network apparatus, a SR for requesting an UL resource grant along with an acknowledgement for the sent downlink RRC re-establishment message 4 (msg4) on a common physical uplink control channel (PUCCH) from the UE, and sending, by the network apparatus, an UL resource grant to the UE in a message based on the received SR.

In an example embodiment, sending, by the network apparatus, the downlink RRC re-establishment message and facilitating the allocation of the uplink resource grant to the UE comprises: sending the downlink RRC re-establishment message 4 (msg4) including the Uplink resource grant to the UE.

Accordingly, an example embodiment herein provides a method for handling a RRC re-establishment procedure in a wireless network. The method includes: detecting, by a UE in the wireless network, a radio link failure; sending, by the UE, an RRC re-establishment request message to the network apparatus; receiving, by the UE, a downlink RRC re-establishment message by allocating an Uplink resource grant from the network apparatus; and sending, by the UE, a RRC re-establishment complete message to the network apparatus on the allocated uplink granted resource.

In an example embodiment, receiving, by the UE, a downlink RRC re-establishment message by allocating an Uplink resource grant from the network apparatus includes: receiving, by the UE, the downlink RRC re-establishment message from the network apparatus, sending, by the UE, an acknowledgement to the network apparatus for the received downlink RRC re-establishment message, and receiving, by the UE, a pre-emptive uplink resource grant in a message from the network apparatus after receiving the acknowledgement from the UE for the sent RRC re-establishment response message.

In an example embodiment, receiving, by the UE, an downlink RRC re-establishment message by allocating an Uplink resource grant from the network apparatus includes: receiving, by the UE, the downlink RRC re-establishment message including a dedicated SR configuration in a DL DCCH from the network apparatus, sending, by the UE, a SR for requesting an UL resource grant to the network apparatus, and sending, by the UE, an UL resource grant to the network apparatus in a message based on the received SR.

In an example embodiment, receiving, by the UE, an downlink RRC re-establishment message by allocating an Uplink resource grant from the network apparatus includes: receiving, by the UE, the downlink RRC re-establishment message from the network apparatus, sending, by the UE, a SR for requesting an UL resource grant along with an acknowledgement for the received downlink RRC re-establishment message 4 (msg4) in a common PUCCH to the network apparatus, and receiving, by the UE, an UL resource grant from the network apparatus in a message based on the received SR.

In an example embodiment, receiving, by the UE, a downlink RRC re-establishment message by allocating an Uplink resource grant from the network apparatus comprises: receiving the downlink RRC re-establishment message 4 (msg4) including the Uplink resource grant from the network apparatus.

Accordingly, an example embodiment herein provides a network apparatus for handling a RRC re-establishment procedure in a wireless network. The network apparatus includes: an RRC re-establishment (RRE) procedure controller communicatively coupled to a memory and a processor. The RRE procedure controller is configured to: detect a radio link failure at a UE in the wireless network; receive an RRC re-establishment request message from the UE; send a downlink RRC re-establishment message and facilitating the allocation of an uplink grant to the UE; and receive a RRC re-establishment complete message from the UE on the allocated uplink grant resource.

Accordingly, an example embodiment herein provides a UE for handling a RRC re-establishment procedure in a wireless network. The UE includes: an RRE procedure controller communicatively coupled to a memory and a processor. The RRE procedure controller is configured to: detect a radio link failure; send an RRC re-establishment request message to the network apparatus; receive a downlink RRC re-establishment message by allocating an Uplink resource grant from the network apparatus; and send a RRC re-establishment complete message to the network apparatus on the allocated uplink granted resource.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the scope thereof, and the embodiments herein include all such modifications.

BRIEF DESCRIPTION OF THE DRAWINGS

The embodiments are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1:
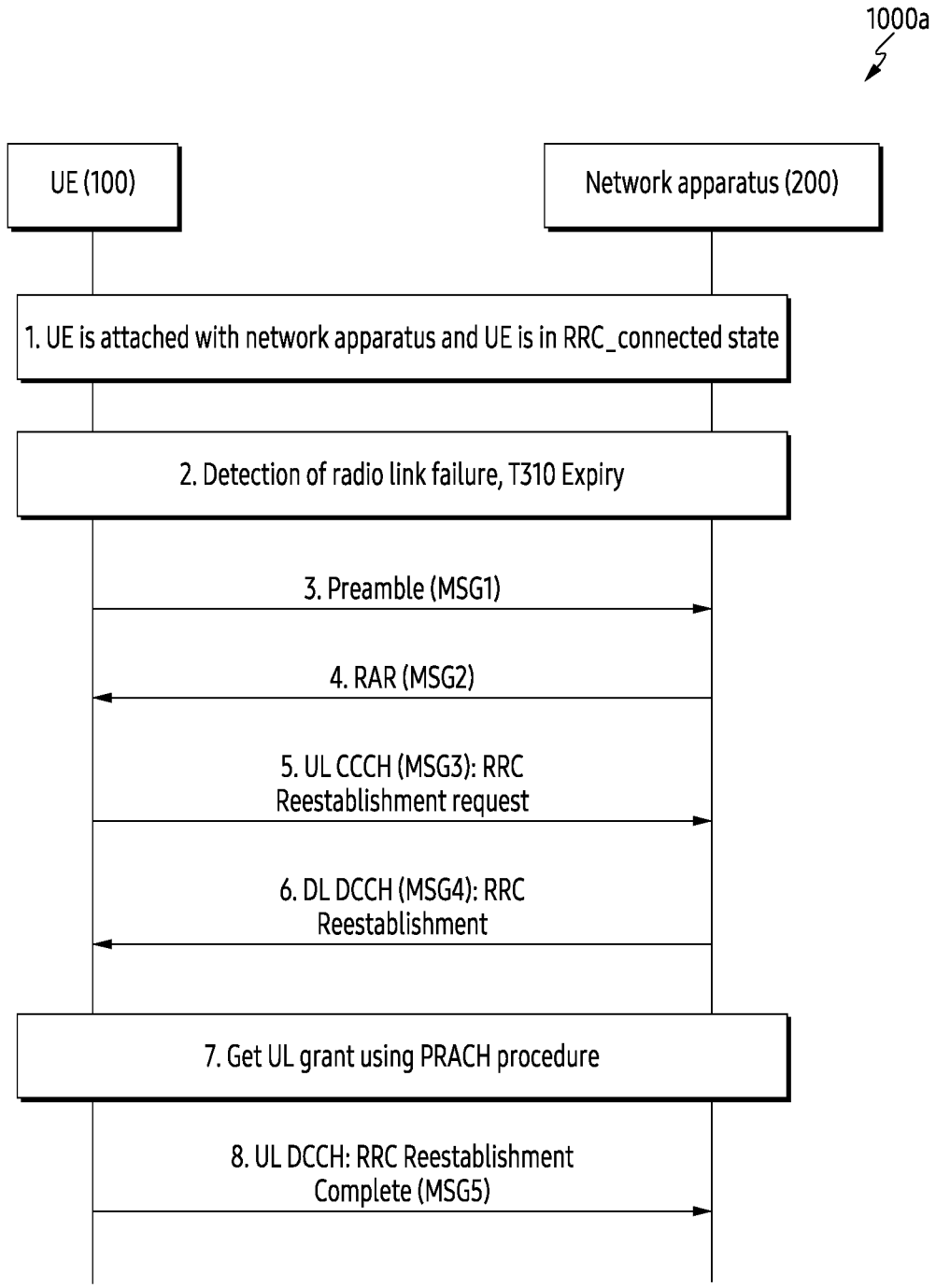
FIG. 1 is a signal flow diagram illustrating a method to improve RRC Re-Establishment procedure in a wireless network (e.g., 5G NR or the like), according to the prior art.

The various example embodiments herein and the various features and advantageous details thereof are explained in greater detail below with reference to the non-limiting embodiments that are illustrated in the accompanying drawings and detailed in the following description. Descriptions of well-known components and processing techniques may be omitted so as to not unnecessarily obscure the embodiments herein. The various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the disclosure herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms "UE" and "terminal" are used interchangeably in the disclosure.

Accordingly, various example embodiments herein provide a method for handling a RRC re-establishment procedure in a wireless network. The method includes detecting, by a network apparatus in the wireless network, a radio link failure at a UE in the wireless network. Further, the method includes receiving, by the network apparatus, an RRC re-establishment request message from the UE. Further, the method includes sending, by the network apparatus, a downlink RRC re-establishment message and facilitating the allocation of an uplink grant to the UE. Further, the method includes receiving, by the network apparatus, a RRC re-establishment complete message from the UE on the allocated uplink grant resource.

The disclosed method improves the rate of resumption of radio connection and traffic post an RRE event. Further, the disclosed method improves user experience in terms of reduced signalling overhead and hence power consumption will be reduced. Further, the disclosed method improves a User Equipment (UE/gNB) processing by reducing random access signalling.

The disclosed method can be used to cut down on the unnecessary signalling incurred during NR RRE procedure to get Uplink (UL) grant to send Msg5 (RRE Complete). The disclosed method obtains the UL grant in case of RRE to make it easier/faster to send Msg5 (RRE Complete) by the terminal/UE. The disclosed scenario of transmission of UL grant in a Downlink (DL) RRE message look at various ways to easily and quickly give the UE the UL grant that it needs to transmit Msg5 (RRE Complete).

The disclosed method cuts down the unnecessary signalling during NR RRE procedure:
 a) Transmission of a pre-emptive (autonomous) UL grant after msg4 (DL: RRE) Feedback reception by the network apparatus (e.g., gNB or the like),
 b) Provide dedicated SR information in DL: RRE message, so that Terminal need NOT perform RACH procedure to get UL grant
 c) Make use of PUCCH-COMMON to send SR during RRE (Msg4 phase), and
 d) Transmission of the UL grant inside DL: RRC ReEstablishment message Unlike to the conventional methods, the disclosed method provides a quicker and optimal approach to RRC ReEstablishment procedure by efficient UL grant allocation to the UE to send RRCReEstablishmentComplete.

Referring now to the drawings and more particularly to FIGS. 2 through 8, where similar reference characters denote corresponding features consistently throughout the figures, there are shown various example embodiments.

Figure 2:
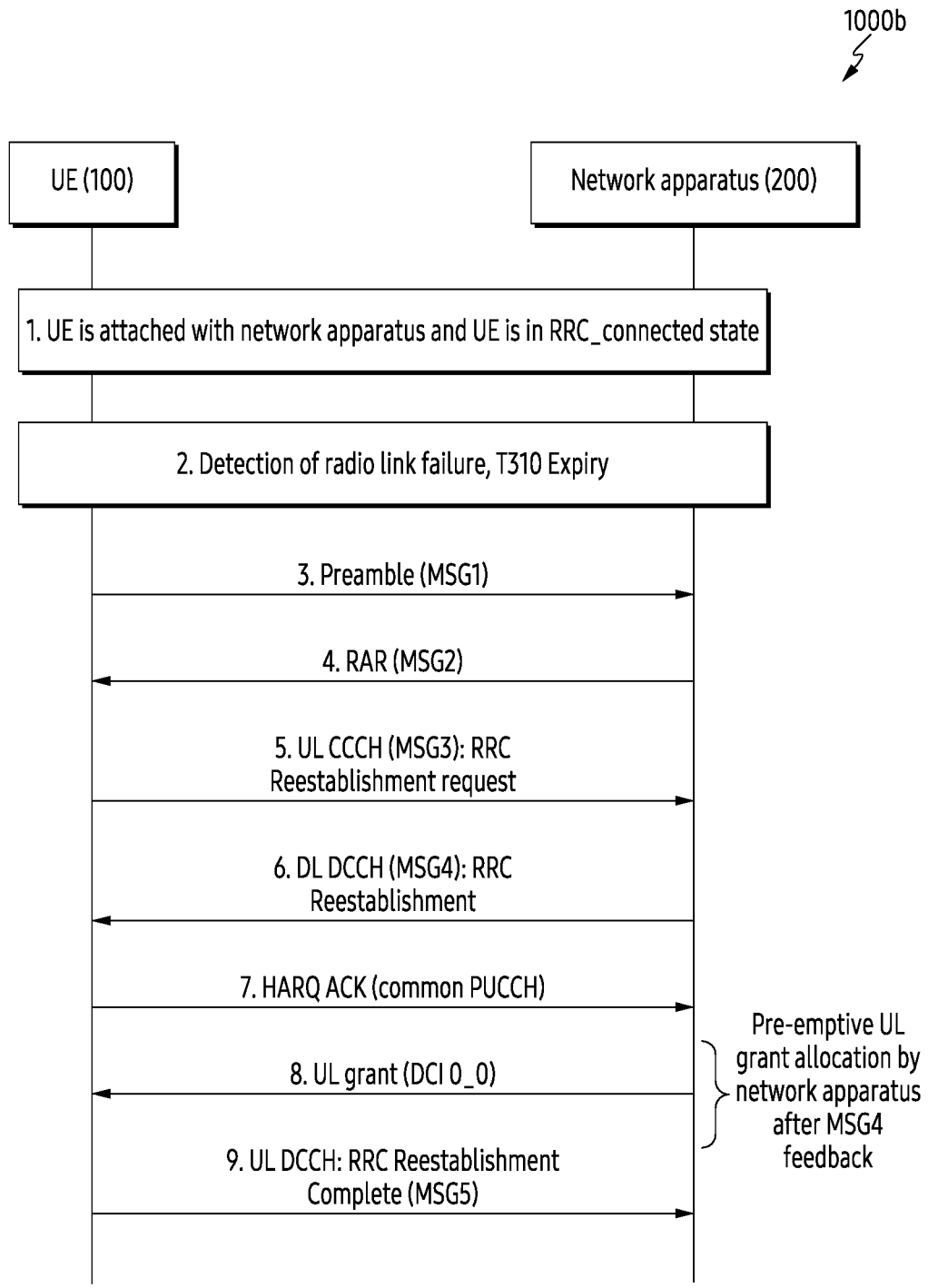
FIG. 2 is a signal flow diagram illustrating an example of pre-emptive (autonomous) transmission of a UL grant post Msg4 feedback reception in the wireless network, according to various embodiments.

FIG. 2 is a signal flow diagram illustrating an example scenario of pre-emptive transmission of UL grant post Msg4 Feedback reception in the wireless network (1000b), according to various embodiments.

In an embodiment, the wireless network (1000b) includes a UE (100) and a network apparatus (200). The UE (100) can be, for example, but not limited to a cellular phone, a smart phone, a Personal Digital Assistant (PDA), a tablet computer, a laptop computer, an Internet of Things (IoT) or the like. The network apparatus (200) may also include or be referred to by those skilled in the art as a base station, a base transceiver station, a radio base station, an access point, a radio transceiver, an eNB, a gNodeB (GNB), a 5G eNB, 5G NR, or the like. The wireless network (1000b) can be, for example, but not limited to a new radio (NR) radio access network (RAN), a 5G NR network, a cloud RAN (CRAN), a virtual RAN (VRAN), a mmwave system, a 6G system or the like.

Referring to FIG. 2, at 1, the UE (100) is attached with the network apparatus (200) and the UE (100) is in the RRC_connected state. At 2, the UE (100) detects the radio link failure after the T310 expiry. At 3, the UE (100) sends the preamble (MSG1) to the network apparatus (200). At 4, the network apparatus (200) sends the RAR (MSG2) to the UE (100) based on the preamble. At 5, the UE (100) sends the UL CCCH (MSG3): RRC reestablishment request to the network apparatus (200). At 6, the network apparatus (200) sends the DL DCCH (MSG4): RRC reestablishment to the UE (100). At 7, the UE (100) sends the HARQ ACK (common PUCCH) to the network apparatus (200). At 8, the UE (100) obtains the UL grant (DCI 0_0). The network apparatus (200) provides the pre-emptive UL grant allocation after MSG 4 feedback. At 9, the UE (100) sends the UL DCCH: RRC reestablishmentcomplete (MSG5) to the network apparatus (200).

Referring to FIG. 2, a much simpler solution of providing the UL grant to the UE (100) is possible if the network apparatus (200) does a pre-emptive UL grant allocation after receiving the HARQ Feedback for Msg4 during the RRE.

Once the HARQ Feedback (msg4) is received during RRE, the network apparatus (200) (e.g., gNB or the like) can allocate the UL grant to the UE (100) which it can use to make Msg5 (RRE Complete) transmission on PUSCH.

The gNB scheduler can do a pre-emptive UL grant allocation using UL DCI 0_0 after reception of Msg4 HARQ Feedback. The UE (100) need not perform any PRACH procedure to get the UL grant and can directly initiate Msg5 transmission carrying RRE Complete.

Figure 3:
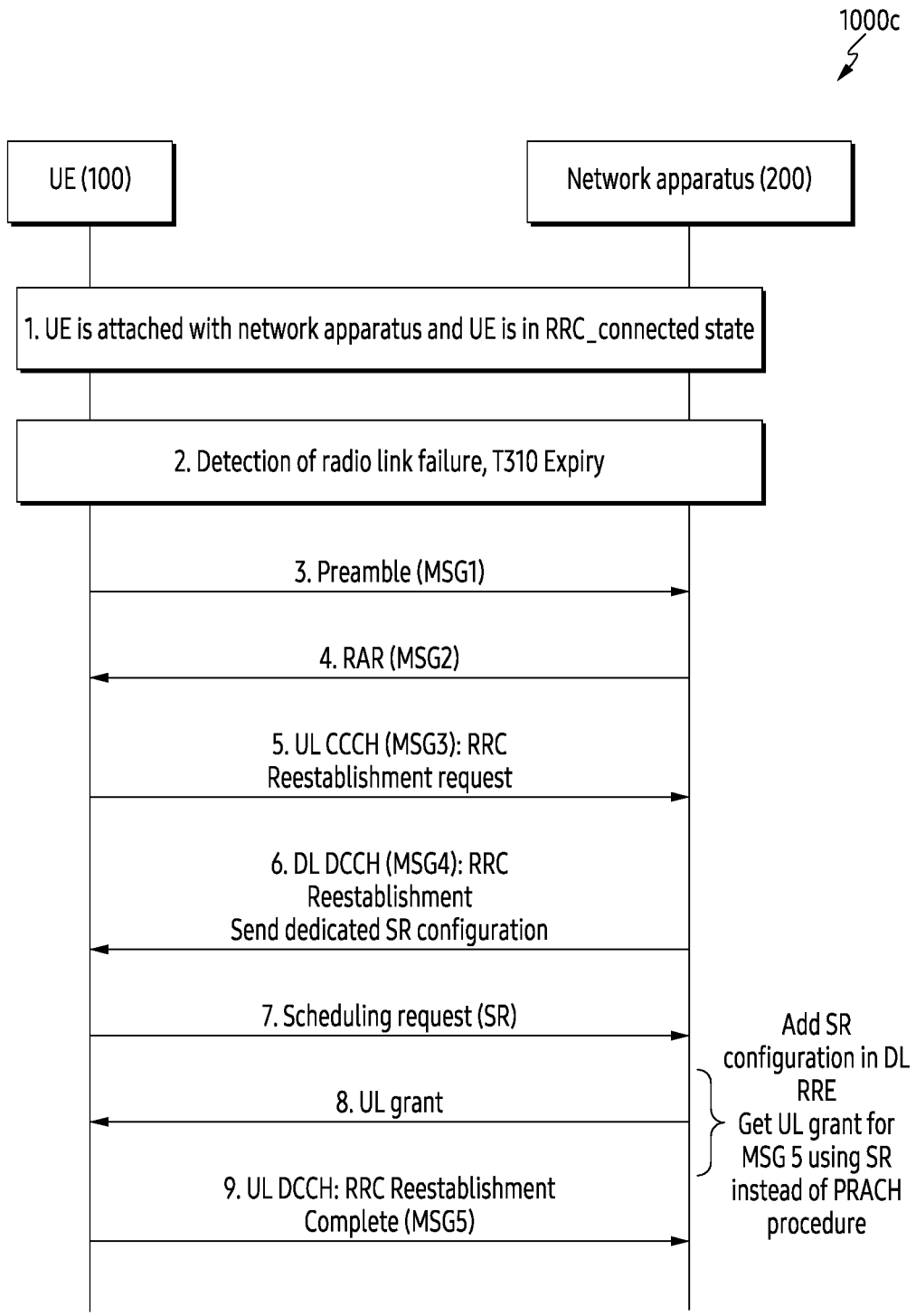
FIG. 3 is a signal flow diagram illustrating an example scenario of Include dedicated SR/PUCCH configuration in a DL RRE in the wireless network, according to various embodiments.

FIG. 3 is a signal flow diagram illustrating an example scenario of including dedicated SR/PUCCH configuration in a DL RRE in the wireless network (1000c), according to various embodiments.

Referring to FIG. 3, at 1, the UE (100) is attached with the network apparatus (200) and the UE (100) is in the RRC_connected state. At 2, the UE (100) detects the radio link failure after the T310 expiry. At 3, the UE (100) sends the preamble (MSG1) to the network apparatus (200). At 4, the network apparatus (200) sends the RAR (MSG2) to the UE (100) based on the preamble. At 5, the UE (100) sends the UL CCCH (MSG3): RRC reestablishment request to the network apparatus (200). At 6, the network apparatus (200) sends the DL DCCH (MSG4): RRC reestablishment to the UE (100). The network apparatus (200) sends the dedicated SR configuration to the UE (100).

At 7, the UE (100) sends the SR to the network apparatus (200). At 8, the UE (100) obtains the UL grant. The network apparatus (200) adds the SR configuration in the DL RRE and obtains the UL grant for MSG 5 using the SR instead of PRACH procedure. At 9, the UE (100) sends the UL DCCH: RRC reestablishmentcomplete (MSG5) to the network apparatus (200).

In the existing methods, a current DL DCCH RRC R-Establishment message is substantially empty. In the disclosed method IEs related to dedicate SR so that the UE (100) can raise SR to get UL grant for Msg5 transmission. In an example, the IEs to be included in DL RRE message for SR to operate are—
 RRCReestablishment-IEs::=SEQUENCE {
 nextHopChainingCount NextHopChainingCount,
 schedulingRequestConfig SchedulingRequestConfig OPTIONAL, —Need M
 schedulingRequestResourceToAddModList SEQUENCE (SIZE (1..maxNrofSR-Resources)) OF
 SchedulingRequestResourceConfig OPTIONAL, —Need N schedulingRequestPucchResource PUCCH-Resource
  OPTIONAL, —Need N
lateNonCriticalExtension OCTET STRING OPTIONAL,
nonCriticalExtension SEQUENCE { } OPTIONAL
}

Further, the specification impacted TS 38.331 (RRC Specification). In this method, a change is proposed in DL DCCH: RRC Re-Establishment message, to contain the necessary dedicated SR information for the Terminal to (easily) get the UL grant for Msg5 (RRE Complete) transmission.

In NR for the UE (100) to make a SR transmission, it needs SR specific configuration and a dedicated PUCCH resource for SR transmission (SchedulingRequestConfig), SR Resource config (SchedulingRequestResourceConfig) (PUCCH-resource).

Pre-Emptive transmission of the UL grant post Msg4 Feedback reception provides addition of these 3 IE in DL RRE for terminal to be able to make an SR transmission for the UL grant.

Figure 4:
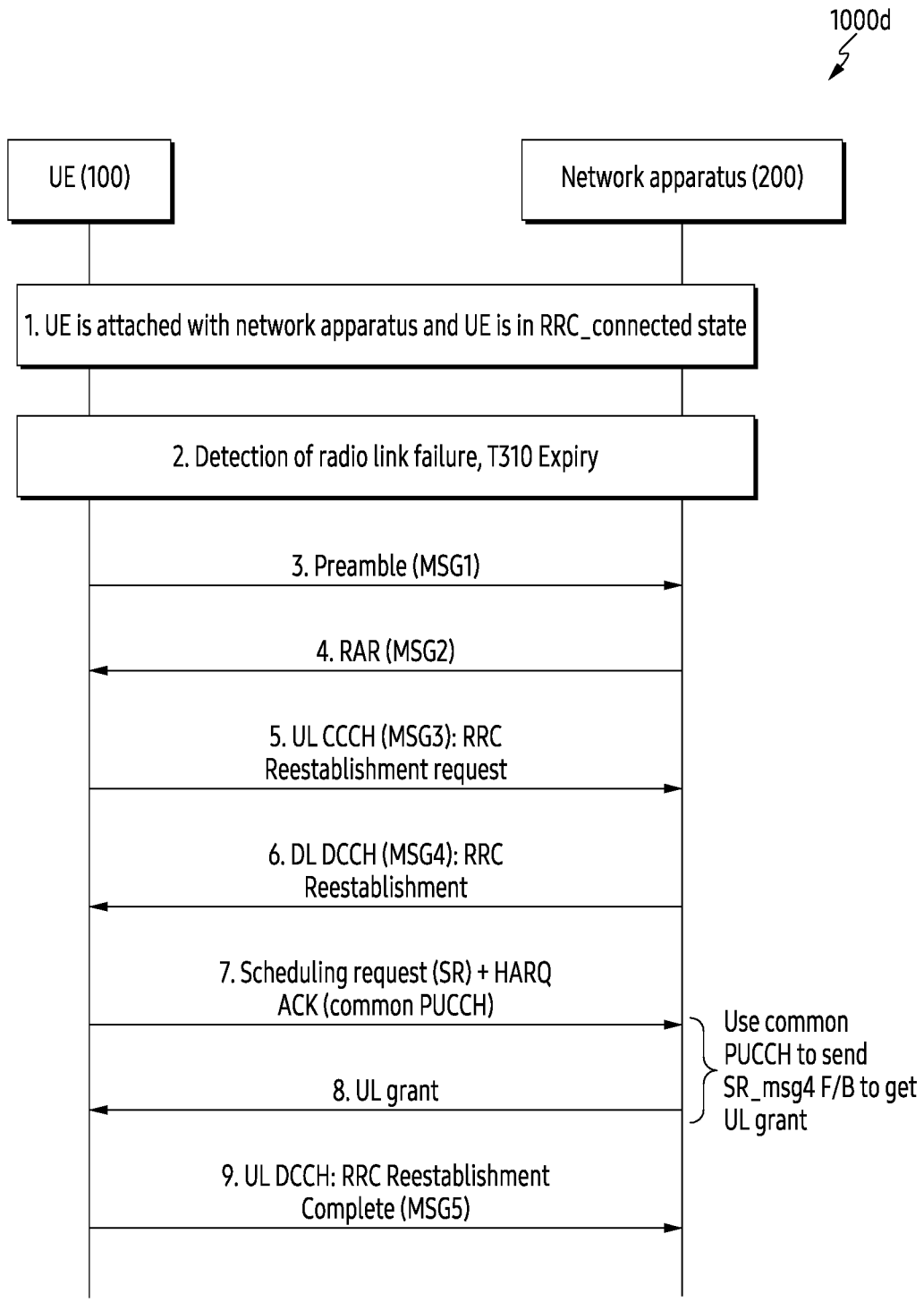
FIG. 4 is a signal flow diagram illustrating an example scenario of usage of COMMON-PUCCH for a SR transmission during RRE in the wireless network, according to various embodiments.

FIG. 4 is a signal flow diagram illustrating an example scenario of usage of COMMON-PUCCH for SR transmission during RRE in the wireless network (1000d), according to various embodiments.

Referring to FIG. 4, at 1, the UE (100) is attached with the network apparatus (200) and the UE (100) is in the RRC_connected state. At 2, the UE (100) detects the radio link failure after the T310 expiry. At 3, the UE (100) sends the preamble (MSG1) to the network apparatus (200). At 4, the network apparatus (200) sends the RAR (MSG2) to the UE (100) based on the preamble. At 5, the UE (100) sends the UL CCCH (MSG3): RRC reestablishment request to the network apparatus (200). At 6, the network apparatus (200) sends the DL DCCH (MSG4): RRC reestablishment to the UE (100).

At 7, the UE (100) sends the combination of the SR and the HARQ ACK to the network apparatus (200). At 8, the UE (100) obtains the UL grant. The network apparatus (200) uses the common PUCCH to send SR_msg4 F/B to get UL grant. At 9, the UE (100) sends the UL DCCH: RRC reestablishmentcomplete (MSG5) to the network apparatus (200).

Referring to FIG. 4 this solution illustrates the use COMMON-PUCCH for SR transmission during RRE procedure (after Msg4). The common PUCCH (pucch-ResourceCommon) is used for HARQ feedback transmission for Msg4 in SA systems. It is recommended that the UE (100) uses PUCH-COMMON for the transmission of SR+Msg4 Feedback. The UE (100) can use the same PUCCH-COMMON resource for combined SR+Msg4 Feedback transmission. The gNB base station should configure L1/MODEM for SR+HARQ (2 bits) reception in this case and should release the PRI only once it gets SR+Msg4 HARQ Feedback together.

This will facilitate an easy SR transmission (and UL grant reception) and cut down an unnecessary PRACH signalling during RRE.

In this example method, the specification impacted is TS 38.213. Sec 9.2.1 needs to be extended for SR transmission as well in case of RRE.

Common PUCCH usage can be extended for simultaneous SR+Msg4 Feedback transmission as a response to DL RRE. Currently, after Msg4 (DL RRE) is received, the UE (100) sends HARQ feedback using common PUCCH using the spec provided PUCCH resource (TS 38.213: Table 9.2.2.1).

Unlike to the conventional methods and systems, the UE (100) can send a SR using the same common PUCCH resource (same rPUCCH). Effectively 2 bits of SR+HARQ msg4 should be transmitted by the UE (100). The base station needs to hold/reserve the PRI allocated until SR+Msg4 Feedback is received in this case. In a successful use case, gNB shall release the reserved PRI upon SR+Feedback reception. In an unsuccessful case, gNB to allocate the same (or a new) PRI for Msg4/SR retransmission.

Figure 5:
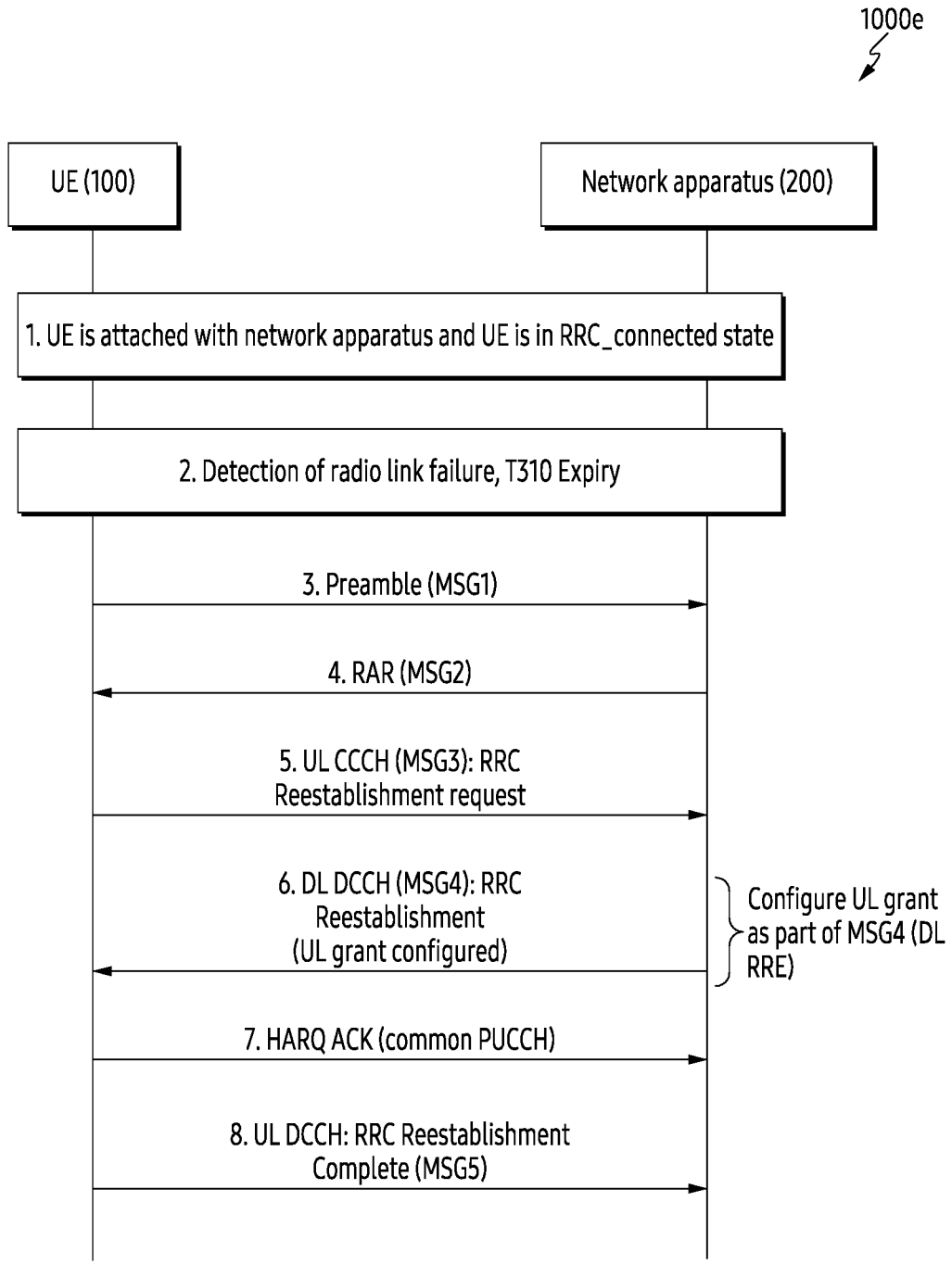
FIG. 5 is a signal flow diagram illustrating an example scenario of transmission of UL grant in a DL RRE message in the wireless network, according to various embodiments.

FIG. 5 is a signal flow diagram illustrating an example scenario of transmission of UL grant in a DL RRE message in the wireless network (1000e), according to various embodiments.

Referring to FIG. 5, at 1, the UE (100) is attached with the network apparatus (200) and the UE (100) is in the RRC_connected state. At 2, the UE (100) detects the radio link failure after the T310 expiry. At 3, the UE (100) sends the preamble (MSG1) to the network apparatus (200). At 4, the network apparatus (200) sends the RAR (MSG2) to the UE (100) based on the preamble. At 5, the UE (100) sends the UL CCCH (MSG3): RRC reestablishment request to the network apparatus (200). At 6, the network apparatus (200) sends the DL DCCH (MSG4): RRC reestablishment to the UE (100). The network apparatus (200) configures the UL grant as part of MSG4 (DL RRE). At 7, the UE (100) sends the HARQ ACK including the common PUCCH to the network apparatus (200). At 8, the UE (100) sends the UL DCCH: RRC reestablishmentcomplete (MSG5) to the network apparatus (200).

Referring to FIG. 5, it is possible to embed the UL grant allocation in DL RRE itself. The grant should contain all necessary components for the Terminal to be able to make the PUSCH transmission (for msg5).

To minimize/reduce the #bits needed in grant, certain grant characteristics can be fixed: Frequency Hopping OFF, NDI, RV and HPID can be chosen as fixed values of 0. That leaves primarily Frequency Resource (14 bits), Time Resource (4 bits), MCS (4 bits), BwpIndicator (0~2 bit). The gNB MAC can supply the UL grant to higher layers (which will form the DL RRE) and include it.

In the system operation, the changes are needed in specifications impacted: TS 38.331.

RRCReestablishment-IEs::=SEQUENCE {nextHop-
  ChainingCount
  NextHopChainingCount,
  msg5UlGrant BIT STRING (SIZE (22~24 bits)),
  lateNonCriticalExtension OCTET STRING
    OPTIONAL,
}

| Msg5 Grant Field | No of Bits | Comment |
|---|---|---|
| BandwidthartIndicator | 2 | Calculated as log2(Nbwp) |
| Frequency Resource allocation | 14 | |
| Time Resource allocation | 4 | |
| MCS | 4 | |

The disclosed method reduces the duration of terminal out-of-sync. Further, in the disclosed method faster resumption of radio connection and data transmission. Further, in the disclosed method random access overhead is reduced. Further, in the disclosed method, the RRE success Key Performance Indicator (KPI) is likely to improve and provide faster data transmission resumption, thereby effectively better cell throughput KPIs and retain ability KPI will be improved.

Figure 6A:
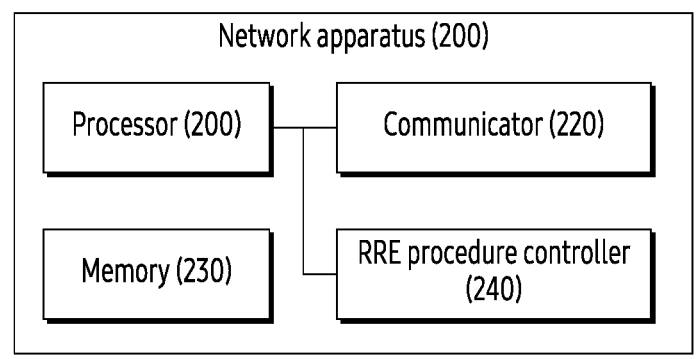
FIG. 6A is a block diagram illustrating an example configuration of a network apparatus, according to various embodiments.

FIG. 6A is a block diagram illustrating an example configuration of the network apparatus (200), according to various embodiments. In an embodiment, the network apparatus (200) includes a processor (e.g., including processing circuitry) (210), a communicator (e.g., including communication circuitry) (220), a memory (230) and an RRE procedure controller (e.g., including various processing circuitry and/or executable program instructions) (240). The processor (210) is coupled with the communicator (220), the memory (230) and the RRE procedure controller (240).

The RRE procedure controller (240) detects the radio link failure at the UE (100) in the wireless network (1000b-1000e (hereafter the label of the wireless network is 1000)) and receives the RRC re-establishment request message from the UE (100). Further, the RRE procedure controller (240) sends the downlink RRC re-establishment message and facilitates the allocation of the uplink grant to the UE (100).

In an embodiment, the RRE procedure controller (240) sends the downlink RRC re-establishment message to the UE (100) and receives an HARQ level acknowledgement from the UE (100) for the sent downlink RRC re-establishment message 4 (msg4). Further, the RRE procedure controller (240) allocates the pre-emptive uplink resource grant after receiving the HARQ level acknowledgement from the UE (100) for the sent downlink RRC re-establishment message for UE (100) to transmit RRC Re-establishment Complete message 5 (msg5).

In an embodiment, the RRE procedure controller (240) sends the downlink RRC re-establishment message including the dedicated scheduling request (SR) configuration in the DL DCCH RRC Re-Establishment message to the UE (100). Further, the RRE procedure controller (240) receives the SR for requesting the UL resource grant from the UE (100) and sends an UL resource grant to the UE (100) based on the received SR.

In an embodiment, the RRE procedure controller (240) sends the downlink RRC re-establishment message to the UE (100) and receives a scheduling request (SR) for requesting an Uplink (UL) resource grant along with an acknowledgement for the sent downlink RRC re-establishment message 4 (msg4) on a common PUCCH from the UE (100). Further, the RRE procedure controller (240) sends an UL resource grant to the UE (100) in message 5 (msg5) based on the received SR.

In a embodiment, the RRE procedure controller (240) sends the downlink RRC re-establishment message 4 (msg4) including the Uplink resource grant to the UE (100).

Further, the RRE procedure controller (240) receives a RRC re-establishment complete message from the UE (100) on the allocated uplink grant resource.

The RRE procedure controller (240) may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) may include various processing circuitry and is configured to execute instructions stored in the memory (230) and to perform various processes. The communicator (220) may include various communication circuitry and is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although FIG. 6A illustrates various hardware components of the network apparatus (200) it is to be understood that various embodiments are not limited thereon. In various embodiments, the network apparatus (200) may include less or more number of components. Further, the labels or names of the components are used only for illustrative purpose and does not limit the scope of the disclosure. One or more components can be combined together to perform same or substantially similar function in the network apparatus (200).

Figure 6B:
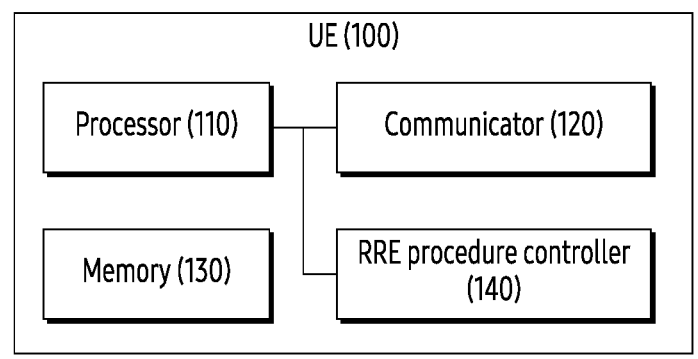
FIG. 6B is a block diagram illustrating an example configuration of a UE, according to various embodiments.

FIG. 6B is a block diagram illustrating an example configuration of the UE (100), according to various embodiments. In an embodiment, the UE (100) includes a processor (e.g., including processing circuitry) (110), a communicator (e.g., including communication circuitry) (120), a memory (130) and an RRE procedure controller (e.g., including various processing circuitry and/or executable program instructions) (140). The processor (110) is coupled with the communicator (120), the memory (130) and the RRE procedure controller (140).

The RRE procedure controller (140) detects the radio link failure and sends the RRC re-establishment request message to the network apparatus (200). Further, the RRE procedure controller (140) receives the downlink RRC re-establishment message by allocating the uplink resource grant from the network apparatus (200).

In an embodiment, the RRE procedure controller (140) receives the downlink RRC re-establishment message from the network apparatus (200). Further, the RRE procedure controller (140) sends the acknowledgement to the network apparatus (200) for the received downlink RRC re-establishment message. Further, the RRE procedure controller (140) receives the pre-emptive uplink resource grant in the message 5 (msg5) from the network apparatus (200) after receiving the acknowledgement from the UE (100) for the sent RRC re-establishment response message.

In an embodiment, the RRE procedure controller (140) receives the downlink RRC re-establishment message including the dedicated SR configuration in the DL DCCH from the network apparatus (200). Further, the RRE procedure controller (140) sends a SR for requesting the UL resource grant to the network apparatus (200). Further, the RRE procedure controller (140) sends the UL resource grant to the network apparatus (200) based on the received SR.

In an embodiment, the RRE procedure controller (140) receives the downlink RRC re-establishment message from the network apparatus (200). Further, the RRE procedure controller (140) sends the SR for requesting the UL resource grant along with the acknowledgement for the received downlink RRC re-establishment message 4 (msg4) in the common PUCCH to the network apparatus (200). Further, the RRE procedure controller (140) receives an UL resource grant from the network apparatus (200) based on the received SR.

In an embodiment, the RRE procedure controller (140) receives the downlink RRC re-establishment message 4 (msg4) including the uplink resource grant from the network apparatus (200).

Further, the RRE procedure controller (140) sends a RRC re-establishment complete message to the network apparatus (200) on the allocated uplink granted resource.

The RRE procedure controller (140) may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) may include various processing circuitry and is configured to execute instructions stored in the memory (130) and to perform various processes. The communicator (120) may include various communication circuitry and is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In certain examples, a non-transitory storage medium may store data that can, over time, change (e.g., in Random Access Memory (RAM) or cache).

Although FIG. 6B illustrates various hardware components of the UE (100) it is to be understood that various embodiments are not limited thereon. In various embodiments, the UE (100) may include less or more number of components. Further, the labels or names of the components are used only for illustrative purpose and does not limit the scope of the disclosure. One or more components can be combined together to perform same or substantially similar function in the UE (100).

Figure 7:
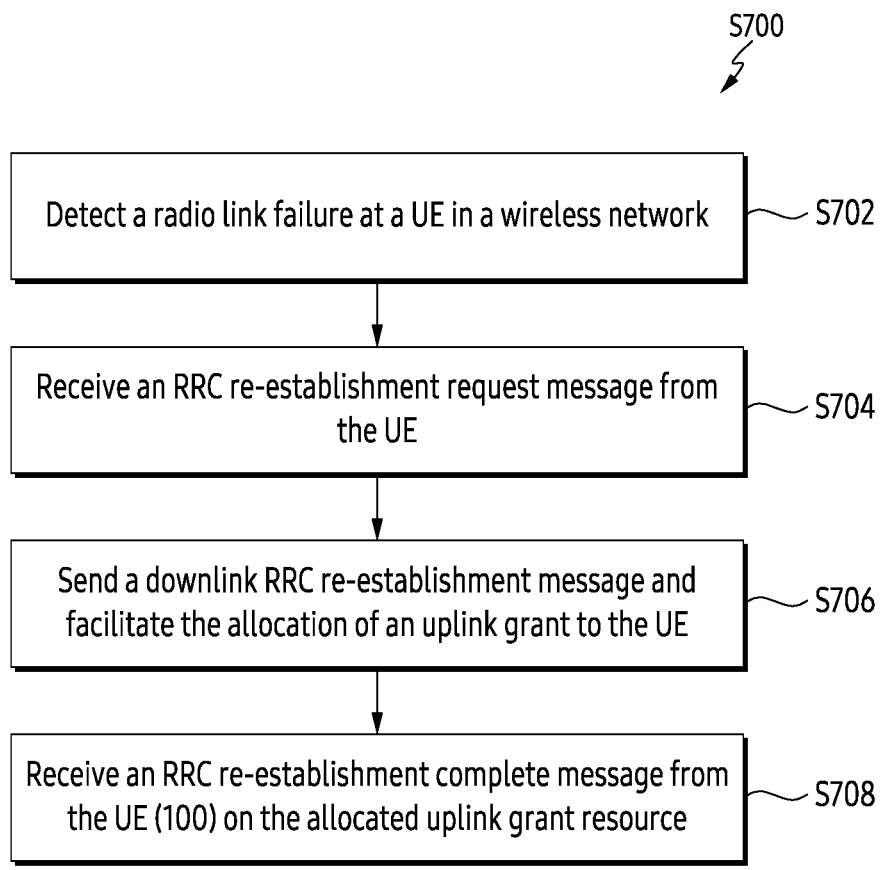
FIG. 7 is a flowchart illustrating an example method, implemented by the network apparatus, for handling a RRC re-establishment procedure in a wireless network, according to various embodiments.

FIG. 7 is a flowchart (S700) illustrating an example method, implemented by the network apparatus (200), for handling the RRC re-establishment procedure in the wireless network (1000), according to various embodiments. The operations (S702-S708) may be handled, for example, by the RRE procedure controller (140).

At S702, the method includes detecting the radio link failure at the UE (100) in the wireless network (1000). At S704, the method includes receiving the RRC re-establishment request message from the UE (100). At S706, the method includes sending the downlink RRC re-establishment message and facilitating the allocation of the uplink grant to the UE (100). At S708, the method includes receiving the RRC re-establishment complete message from the UE (100) on the allocated uplink grant resource.

Figure 8:
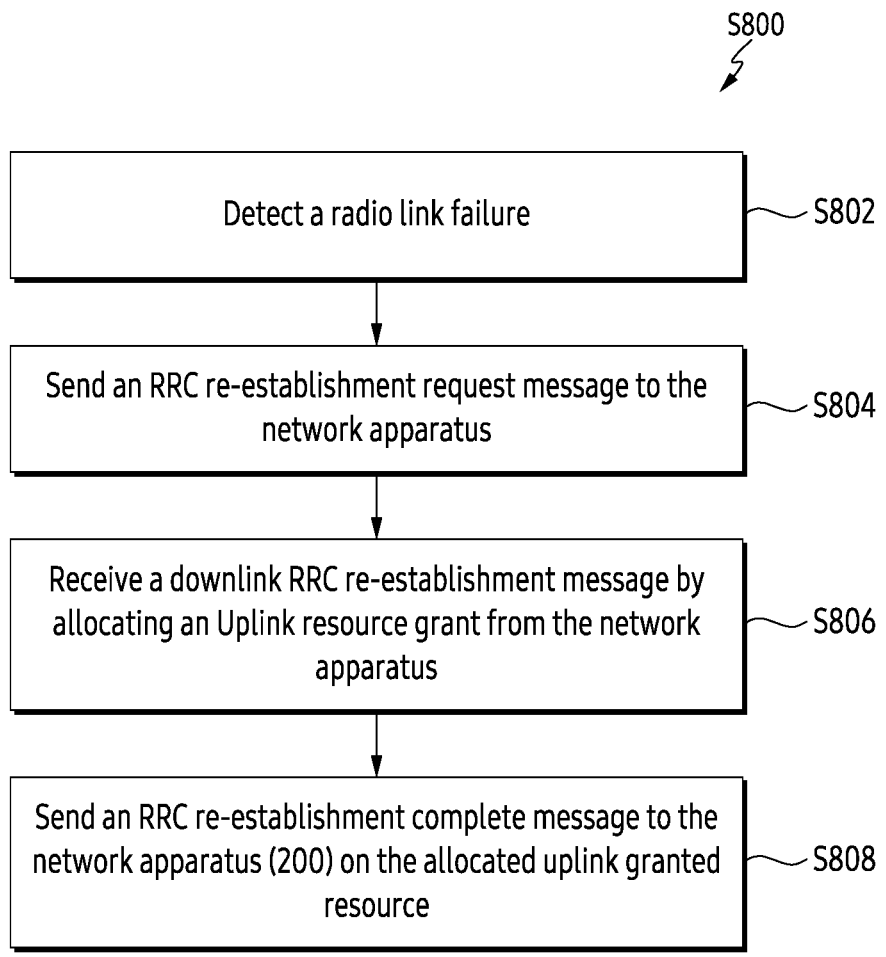
FIG. 8 is a flowchart illustrating an example method, implemented by the UE, for handling a RRC re-establishment procedure in the wireless network, according to various embodiments.

FIG. 8 is a flowchart (S800) illustrating an example method, implemented by the UE (100), for handling the RRC re-establishment procedure in the wireless network (1000), according to various embodiments. The operations (S802-S808) may, for example, be handled by the RRE procedure controller (140).

At S802, the method includes detecting the radio link failure. At S804, the method includes sending the RRC re-establishment request message to the network apparatus (200). At S806, the method includes receiving the downlink RRC re-establishment message by allocating the uplink resource grant from the network apparatus (200). At S808, the method includes sending the RRC re-establishment complete message to the network apparatus (200) on the allocated uplink granted resource.

According to example embodiments, a method for handling a radio resource control (RRC) re-establishment procedure in a wireless network, the method comprises detecting, by a network apparatus in the wireless network, a radio link failure in a user equipment (UE) in the wireless network. The method comprises receiving, by the network apparatus, an RRC re-establishment request message from the UE. The method comprises sending, by the network apparatus, a downlink RRC re-establishment message to provide an allocation of an uplink grant to the UE. The method comprises receiving, by the network apparatus, an RRC re-establishment complete message from the UE on the allocated uplink grant resource.

In an example embodiment, the sending, by the network apparatus, the downlink RRC re-establishment message comprises sending, by the network apparatus, the downlink RRC re-establishment message to the UE. The sending, by the network apparatus, the downlink RRC re-establishment message comprises receiving, by the network apparatus, a hybrid automatic repeat request (HARQ) level acknowledgement from the UE for the sent downlink RRC re-establishment message. The sending, by the network apparatus, the downlink RRC re-establishment message comprises allocating, by the network apparatus, a pre-emptive uplink resource grant after receiving the HARQ level acknowledgement for the sent downlink RRC re-establishment message for UE from the UE, to transmit the RRC re-establishment complete message.

In an example embodiment, the sending, by the network apparatus, the downlink RRC re-establishment message comprises sending, by the network apparatus, the downlink RRC re-establishment message including a dedicated scheduling request (SR) configuration in a downlink dedicated control channel (DL DCCH) to the UE. The sending, by the network apparatus, the downlink RRC re-establishment message comprises receiving, by the network apparatus, an SR for requesting the uplink resource grant from the UE. The sending, by the network apparatus, the downlink RRC re-establishment message comprises sending, by the network apparatus, the uplink resource grant to the UE in a message 5 (msg5) based on the received SR.

In an example embodiment, the sending, by the network apparatus, the downlink RRC re-establishment message comprises sending, by the network apparatus, the downlink RRC re-establishment message including a dedicated scheduling request (SR) configuration in a downlink dedicated control channel (DL DCCH) to the UE. The sending, by the network apparatus, the downlink RRC re-establishment message comprises receiving, by the network apparatus, an SR for requesting the uplink resource grant from the UE. The sending, by the network apparatus, the downlink RRC re-establishment message comprises sending, by the network apparatus, the uplink resource grant to the UE in a message based on the received SR.

In an example embodiment, the sending, by the network apparatus, the downlink RRC re-establishment message comprises sending the downlink RRC re-establishment message including the uplink resource grant to the UE.

According to example embodiments, a method for handling a radio resource control (RRC) re-establishment procedure in a wireless network, the method comprises detecting, by a user equipment (UE) in the wireless network, a radio link failure. The method comprises sending, by the UE, an RRC re-establishment request message to the network apparatus. The method comprises receiving, by the UE, a downlink RRC re-establishment message to provide an allocation of an uplink resource grant from the network apparatus. The method comprises sending, by the UE, an RRC re-establishment complete message to the network apparatus on the allocated uplink granted resource.

In an example embodiment, the receiving, by the UE, the downlink RRC re-establishment message comprises receiving, by the UE, the downlink RRC re-establishment message from the network apparatus. The receiving, by the UE, the downlink RRC re-establishment message comprises sending, by the UE, an acknowledgement to the network apparatus for the received downlink RRC re-establishment message. The receiving, by the UE, the downlink RRC re-establishment message comprises receiving, by the UE, a pre-emptive uplink resource grant in a message from the network apparatus after the acknowledgement for the sent RRC re-establishment message.

In an example embodiment, the receiving, by the UE, a downlink RRC re-establishment message comprises receiving, by the UE, the downlink RRC re-establishment message including a dedicated scheduling request (SR) configuration in a downlink dedicated control channel (DL DCCH) from the network apparatus. The receiving, by the UE, the downlink RRC re-establishment message comprises sending, by the UE, an SR for requesting the uplink (UL) resource grant to the network apparatus. The receiving, by the UE, the downlink RRC re-establishment message comprises sending, by the UE, the uplink resource grant to the network apparatus in a message based on the received SR.

In an example embodiment, the receiving, by the UE, the downlink RRC re-establishment message comprises receiving, by the UE, the downlink RRC re-establishment message from the network apparatus. The receiving, by the UE, the downlink RRC re-establishment message comprises sending, by the UE, a scheduling request (SR) for requesting the uplink resource grant along with an acknowledgement for the received downlink RRC re-establishment message in a common physical uplink control channel (PUCCH) to the network apparatus. The receiving, by the UE, the downlink RRC re-establishment message comprises receiving, by the UE, the uplink resource grant from the network apparatus in a message based on the received SR.

In an example embodiment, the receiving, by the UE, the downlink RRC re-establishment message comprises receiving the downlink RRC re-establishment message including the uplink resource grant from the network apparatus.

According to example embodiments, a network apparatus configured to handle a radio resource control (RRC) re-establishment (RRE) procedure in a wireless network, the network apparatus comprises a memory, at least one processor, and an RRE procedure controller, communicatively coupled to the memory and the at least one processor. The RRE procedure controller is configured to detect radio link failure in a user equipment (UE) in the wireless network. The RRE procedure controller is configured to receive an RRC re-establishment request message from the UE. The RRE procedure controller is configured to send a downlink RRC re-establishment message to provide an allocation of an uplink grant to the UE. The RRE procedure controller is configured to receive a RRC re-establishment complete message from the UE on the allocated uplink grant resource.

In an example embodiment, to send the downlink RRC re-establishment message, the RRE procedure controller is configured to send the downlink RRC re-establishment message to the UE. To send the downlink RRC re-establishment message, the RRE procedure controller is configured to receive a hybrid automatic repeat request (HARQ) level acknowledgement from the UE for the sent downlink RRC re-establishment message. To send the downlink RRC re-establishment message, the RRE procedure controller is configured to allocate a pre-emptive uplink resource grant after receiving the HARQ level acknowledgement for the sent downlink RRC re-establishment message for UE from the UE, to transmit RRC re-establishment complete message.

In an example embodiment, to send the downlink RRC re-establishment message, the RRE procedure controller is configured to send the downlink RRC re-establishment message including a dedicated scheduling request (SR) configuration in a downlink dedicated control channel (DL DCCH) RRC Re-Establishment message to the UE. To send the downlink RRC re-establishment message, the RRE procedure controller is configured to receive a scheduling request (SR) for requesting the uplink resource grant from the UE. To send the downlink RRC re-establishment message, the RRE procedure controller is configured to send the uplink resource grant to the UE in a message based on the received SR.

In an example embodiment, to send the downlink RRC re-establishment message, the RRE procedure controller is configured to send the downlink RRC re-establishment message to the UE. To send the downlink RRC re-establishment message, the RRE procedure controller is configured to receive a scheduling request (SR) for requesting the uplink resource grant along with an acknowledgement for the sent downlink RRC re-establishment message 4 (msg4) on a common physical uplink control channel (PUCCH) from the UE. To send the downlink RRC re-establishment message, the RRE procedure controller is configured to send the uplink resource grant to the UE in a message based on the received SR.

In an example embodiment, to send the downlink RRC re-establishment message, the RRE procedure controller is configured to send the downlink RRC re-establishment message including the uplink resource grant to the UE.

According to example embodiments, a user equipment (UE) configured to handle a radio resource control (RRC) re-establishment (RRE) procedure in a wireless network. The UE comprises a memory, at least one processor, and an RRE procedure controller, communicatively coupled to the memory and the at least one processor. The RRE procedure controller is configured to detect a radio link failure. The RRE procedure controller is configured to send an RRC re-establishment request message to the network apparatus. The RRE procedure controller is configured to receive a downlink RRC re-establishment message to provide an allocation of an uplink resource grant from the network apparatus. The RRE procedure controller is configured to send a RRC re-establishment complete message to the network apparatus on the allocated uplink granted resource.

In an example embodiment, to receive the downlink RRC re-establishment message, the RRE procedure controller is configured to receive the downlink RRC re-establishment message from the network apparatus. To receive the downlink RRC re-establishment message, the RRE procedure controller is configured to send an acknowledgement to the network apparatus for the received downlink RRC re-establishment message. To receive the downlink RRC re-establishment message, the RRE procedure controller is configured to receive a pre-emptive uplink resource grant in a message from the network apparatus after the acknowledgement for the RRC re-establishment message.

In an example embodiment, to receive the downlink RRC re-establishment message, the RRE procedure controller is configured to receive the downlink RRC re-establishment message including a dedicated scheduling request (SR) configuration in a downlink dedicated control channel (DL DCCH) from the network apparatus. To receive the downlink RRC re-establishment message, the RRE procedure controller is configured to send an SR for requesting the uplink resource grant to the network apparatus. To receive the downlink RRC re-establishment message, the RRE procedure controller is configured to send the uplink resource grant to the network apparatus in a message based on the received SR.

In an example embodiment, to receive the downlink RRC re-establishment message, the RRE procedure controller is configured to receive the downlink RRC re-establishment message from the network apparatus. To receive the downlink RRC re-establishment message, the RRE procedure controller is configured to send a scheduling request (SR) for requesting the uplink resource grant along with an acknowledgement for the received downlink RRC re-establishment message in a common physical uplink control channel (PUCCH) to the network apparatus. To receive the downlink RRC re-establishment message, the RRE procedure controller is configured to receive the uplink resource grant from the network apparatus based on the received SR.

In an example embodiment, to receive the downlink RRC re-establishment message, the RRE procedure controller is configured to receive the downlink RRC re-establishment message including the uplink resource grant from the network apparatus.

The method can be used to improve RRC Re-establishment procedure completion time by efficient provisions of UL grant allocation to send RRC Re-EstablishmentComplete. Using the disclosed method, there may be drastic signaling reduction/resource wastage during the RRE procedure, thereby resulting in power saving of the UE (100) and the network apparatus (200).

The disclosed method assists the UE (100) performing the faster resumption of radio connection and data transmission. The disclosed method assists the network apparatus reducing a random access overhead. Based on the disclosed method, the RRE procedure is simplified and has a lower latency and a better chance of success due to reduced signalling.

The various actions, acts, blocks, steps, or the like in the flow charts (S700 and S800) may be performed in the order presented, in a different order or simultaneously. Further, in various embodiments, some of the actions, acts, blocks, steps, or the like may be omitted, added, modified, skipped, or the like without departing from the scope of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a network apparatus for handling a radio resource control (RRC) re-establishment procedure in a wireless network, the method comprising:
    receiving, from a user equipment (UE), an RRC re-establishment request in accordance with a radio link failure being detected in the UE;
    transmitting, to the UE, a downlink RRC re-establishment message;
    receiving, from the UE, a hybrid automatic repeat request (HARQ) level acknowledgement for the transmitted downlink RRC re-establishment message;
    transmitting, to the UE, downlink control information (DCI) including a pre-emptive uplink resource grant in response to receiving the HARQ level acknowledgement for the transmitted downlink RRC re-establishment message; and
    receiving, from the UE, an RRC re-establishment complete message uplink resources of the pre-emptive uplink resource grant.

2. The method of claim 1,
    wherein the
    uplink resources for the RRC re-establishment complete message is provided to the UE without a random access procedure between a transmission of the downlink RRC re-establishment message and a reception of the RRC re-establishment complete message.

3. The method of claim 1,
    wherein
    the HARQ level acknowledgement for the transmitted downlink RRC re-establishment message is received on a common physical uplink control channel (PUCCH),
    wherein the RRC re-establishment complete message is received on a physical uplink shared channel (PUSCH), and
    wherein the pre-emptive uplink resource grant of the DCI is allocated to the UE in response to the HARQ level acknowledgement autonomously without receiving a resource request to transmit the RRC re-establishment complete message.

4. A method performed by a user equipment (UE) for handling a radio resource control (RRC) re-establishment procedure in a wireless network, the method comprising:
    in response to detecting a radio link failure,
    transmitting, to a network apparatus, an RRC re-establishment request message;
    receiving, from the network apparatus, a downlink RRC re-establishment message;
    transmitting, to the network apparatus, a hybrid automatic repeat request (HARQ) level acknowledgement for the received downlink RRC re-establishment message;
    receiving, from the network apparatus, downlink control information (DCI) including a pre-emptive uplink resource grant in accordance with the HARQ level acknowledgement for the downlink RRC re-establishment message; and
    transmitting, to the network apparatus, an RRC re-establishment complete message on uplink resources of the pre-emptive uplink resource grant.

5. The method of claim 4,
wherein
the uplink resources for the RRC re-establishment complete message is obtained without a random access procedure between a reception of the downlink RRC re-establishment message and a transmission of the RRC re-establishment complete message.

6. The method of claim 4,
wherein
the HARQ level acknowledgement for the downlink RRC re-establishment message is transmitted on a common physical uplink control channel (PUCCH),
wherein the RRC re-establishment complete message is transmitted on a physical uplink shared channel (PUSCH), and
wherein the pre-emptive uplink resource grant of the DCI is received without transmitting a resource request to transmit the RRC re-establishment complete message.

7. A network apparatus configured to handle a radio resource control (RRC) re-establishment procedure in a wireless network, the network apparatus comprising:
communication circuitry;
a memory, including storage medium, storing instructions; and
at least one processor including processing circuitry,
wherein the instructions, when executed by the at least one processor, individually and/or collectively, cause the network apparatus to:
receive, from a user equipment (UE), an RRC re-establishment request message in accordance with a radio link failure detected in the UE;
transmit, to the UE, a downlink RRC re-establishment message;
receive, from the UE, a hybrid automatic repeat request (HARQ) level acknowledgement for the transmitted downlink RRC re-establishment message;
transmit, to the UE, downlink control information (DCI) including a pre-emptive uplink resource grant in response to receiving the HARQ level acknowledgement for the transmitted downlink RRC re-establishment message; and
receive, from the UE, a RRC re-establishment complete message on uplink resources of the pre-emptive uplink resource grant.

8. The network apparatus of claim 7,
wherein
the uplink resources for the RRC re-establishment complete message is provided to the UE without a random access procedure between a transmission of the downlink RRC re-establishment message and a reception of the RRC re-establishment complete message.

9. The network apparatus of claim 7,
wherein
the HARQ level acknowledgement for the transmitted downlink RRC re-establishment message is received on a common physical uplink control channel (PUCCH),
wherein the RRC re-establishment complete message is received on a physical uplink shared channel (PUSCH), and
wherein the pre-emptive uplink resource grant of the DCI is allocated to the UE in response to the HARQ level acknowledgement autonomously without receiving a resource request to transmit the RRC re-establishment message.

10. A user equipment (UE) configured to handle a radio resource control (RRC) re-establishment procedure in a wireless network, the UE comprising:
communication circuitry;
a memory, including storage medium, storing instructions; and
at least one processor including processing circuitry,
wherein the instructions, when executed by the at least one processor, individually and/or collectively, cause the UE to:
in response to
detecting a radio link failure,
transmit, to a network apparatus, an RRC re-establishment request message;
receive, from the network apparatus, a downlink RRC re-establishment message;
transmit, to the network apparatus, a hybrid automatic repeat request (HARQ) level acknowledgement for the received downlink RRC re-establishment message;
receive, from the network apparatus, downlink control information (DCI) including a pre-emptive uplink resource grant in accordance with the HARQ level acknowledgement for the downlink RRC re-establishment message; and
transmit, to the network apparatus, a RRC re-establishment complete message on uplink resources of the pre-emptive uplink resource grant.

11. The UE of claim 10,
wherein the uplink resources for the RRC re-establishment complete message is obtained without a random access procedure between a reception of the downlink RRC re-establishment message and a transmission of the RRC re-establishment complete message.

12. The UE of claim 10,
wherein the HARQ level acknowledgement for the downlink RRC re-establishment message is transmitted on a common physical uplink control channel (PUCCH),
wherein the RRC re-establishment complete message is transmitted on a physical uplink shared channel (PUSCH), and
wherein the pre-emptive uplink resource grant of the DCI is received without transmitting resource request to transmit the RRC re-establishment complete message.

* * * * *